United States Patent
Meehan et al.

(10) Patent No.: US 7,765,300 B2
(45) Date of Patent: Jul. 27, 2010

(54) PROTOCOL FOR MESSAGING BETWEEN A CENTRALIZED BROADBAND REMOTE AGGREGATION SERVER AND OTHER DEVICES

(75) Inventors: Thomas J. Meehan, San Francisco, CA (US); Naiming Shen, San Jose, CA (US); Liming Wei, Fremont, CA (US)

(73) Assignee: Ericsson AB, Stockholm (SE)

( * ) Notice: Subject to any disclaimer, the term of this patent is extended or adjusted under 35 U.S.C. 154(b) by 1655 days.

(21) Appl. No.: 10/957,446

(22) Filed: Sep. 30, 2004

(65) Prior Publication Data

US 2005/0152370 A1     Jul. 14, 2005

Related U.S. Application Data

(60) Provisional application No. 60/509,307, filed on Oct. 6, 2003.

(51) Int. Cl.
| G06F 15/16 | (2006.01) |
| G06F 15/173 | (2006.01) |
| H04L 12/28 | (2006.01) |
| H04L 12/56 | (2006.01) |

(52) U.S. Cl. .................. 709/226; 709/204; 709/227; 370/390

(58) Field of Classification Search .............. 709/205, 709/206, 226, 227, 204; 370/390, 432
See application file for complete search history.

(56) References Cited

U.S. PATENT DOCUMENTS

| 6,016,319 | A * | 1/2000 | Kshirsagar et al. | 370/410 |
| 6,138,144 | A * | 10/2000 | DeSimone et al. | 709/204 |
| 2002/0010782 | A1 * | 1/2002 | Hoebeke et al. | 709/227 |
| 2002/0150099 | A1 * | 10/2002 | Pung et al. | 370/390 |
| 2005/0015493 | A1 * | 1/2005 | Anschutz et al. | 709/226 |

OTHER PUBLICATIONS

ETSI EN 301 347: Digital cellular telecommunications system, Phase 2, General Packet Radio Service 9GPRS), GPRS Tunneling Protocol (GTP) across the Gn and Gp Interface, 1998.

(Continued)

*Primary Examiner*—Joseph E Avellino
*Assistant Examiner*—Peter Shaw
(74) *Attorney, Agent, or Firm*—Blakely Sokoloff Taylor & Zafman LLP

(57) ABSTRACT

Protocols for messaging between a centralized network management system and other entities are described. According to one embodiment, in response to a request of a subscriber for joining a multicast group received at a centralized aggregation server, the centralized aggregation server transmits a port subscriber announcement (PSA) message to substantially all subscriber access multiplexers over an access network. The PSA message includes an identifier (ID) of the subscriber. In response to the PSA message, a subscriber access multiplexer having a subscriber matching the ID of the subscriber in the PSA message identifies a user port corresponding to the subscriber and applies a local service policy to the identified user port. Subsequent multicast messages destined to the subscriber are delivered by the subscriber access multiplexer to the subscriber based on the local service policy corresponding to the receiving subscriber without having the aggregation server handling the service policy of the receiving subscriber. Other methods and apparatuses are also described.

19 Claims, 16 Drawing Sheets

OTHER PUBLICATIONS

Townsley, W., et al., Layer 2 Tunneling Protocol L2TP, Aug. 1999.

DSL Forum WT-081, DSL Evolution—Architecture Requirements for the Support of QoS-Enabled IP Services, Mar. 2003.

Fenner, W., Internet Group Management Protocol, Version 2, RFC 223, Nov. 1997.

Cain, B., et al., Internet Group Management Protocol, Version 3, RFC 3376, Oct. 2002.

Esterin, D., et al., Protocol Independent Multicast—Sparse Mode (PIM-SM): Protocol Specification, RFC 2362, Jun. 1998.

Rivest, R., "The MD5 Message-Digest Algorithm," RFC 1321, Apr. 1992.

* cited by examiner

| Type | Length | Message fields... |

FIG. 11

PROTOCOL FOR MESSAGING BETWEEN A CENTRALIZED BROADBAND REMOTE AGGREGATION SERVER AND OTHER DEVICES

This application claims the benefit of U.S. Provisional Application No. 60/509,307, filed Oct. 6, 2003, which is hereby incorporated by reference.

FIELD OF THE INVENTION

The present invention relates generally to communications. More particularly, this invention relates to a protocol for messaging between a centralized broadband remote aggregation server (BRAS) and other devices.

BACKGROUND OF THE INVENTION

In the field of communications, the need for high-speed transmission of data, including video and audio, has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a Plain Old Telephone Service (POTS) line. Other choices for connection, which are at higher speeds, into a network can include Integrated Services Digital Network (ISDN), Digital Subscriber Line (DSL) service, and cable modem service over a Radio Frequency (RF) cable line. Further, other types of content providers may enable a Subscriber to receive different types of media, such as a video stream, audio stream, etc.

In a typical DSL network, DSLAM (Digital Subscriber Line Aggregation Modules) is employed. A DSLAM is an aggregation device interfacing with customer DSL CPE (customer premise equipment) devices in the downstream and with BRAS devices via ATM or packet links in the upstream. The service providers have ever increasing demand to offer new value added services to DSL customers, such as VOIP (voice over IP), NVOD (near video on demand) and differentiated data services. Significant changes to the current DSL infrastructure need to be made to meet the new requirements.

One such important need is to maximally improve the efficiency of the network connecting the BRAS and the DSLAMs. When new services, such as IP-based broadcast TV or NVOD, are offered, IP multicast technology becomes a natural choice. However, with today's DSL infrastructure, such as infrastructure 100 shown in FIG. 1, the multicast traffic has to be replicated by the BRAS 101 for each individual DSL subscriber (e.g., 102 and 103), resulting in potentially large amounts of duplicate packets sent to each DSLAM, such as DSLAM 104. In this infrastructure as shown in FIG. 1, subscriber termination is performed in a centralized BRAS (e.g., BRAS 101). Typically, no other IP entities exist in the DSL access network (DSLAM 104 is typically not IP capable and a home gateway is often not present). There is also no control data exchange between BRAS 101 and other entities in the DSL access network, such as DSLAM 104 and home gateways 102 and 103. Furthermore, quality of service (QoS) is provided within BRAS 101 and it is not distributed to other entities.

SUMMARY OF THE INVENTION

Protocols for messaging between a centralized network management system and other entities are described. According to one embodiment, According to one embodiment, in response to a request of a subscriber for joining a multicast group received at a centralized aggregation server, the centralized aggregation server transmits a port subscriber announcement (PSA) message to substantially all subscriber access multiplexers over an access network. The PSA message includes an identifier (ID) of the subscriber. In response to the PSA message, a subscriber access multiplexer having a subscriber matching the ID of the subscriber in the PSA message identifies a user port corresponding to the subscriber and applies a local service policy to the identified user port. Subsequent multicast messages destined to the subscriber are delivered by the subscriber access multiplexer to the subscriber based on the local service policy corresponding to the receiving subscriber without having the aggregation server handling the service policy of the receiving subscriber. Other methods and apparatuses are also described.

BRIEF DESCRIPTION OF THE DRAWINGS

The present invention is illustrated by way of example and not limitation in the figures of the accompanying drawings in which like references indicate similar elements.

FIGS. 11-16 are block diagrams illustrating exemplary RMR messages according to certain embodiments of the invention.

DETAILED DESCRIPTION

Figure 1:
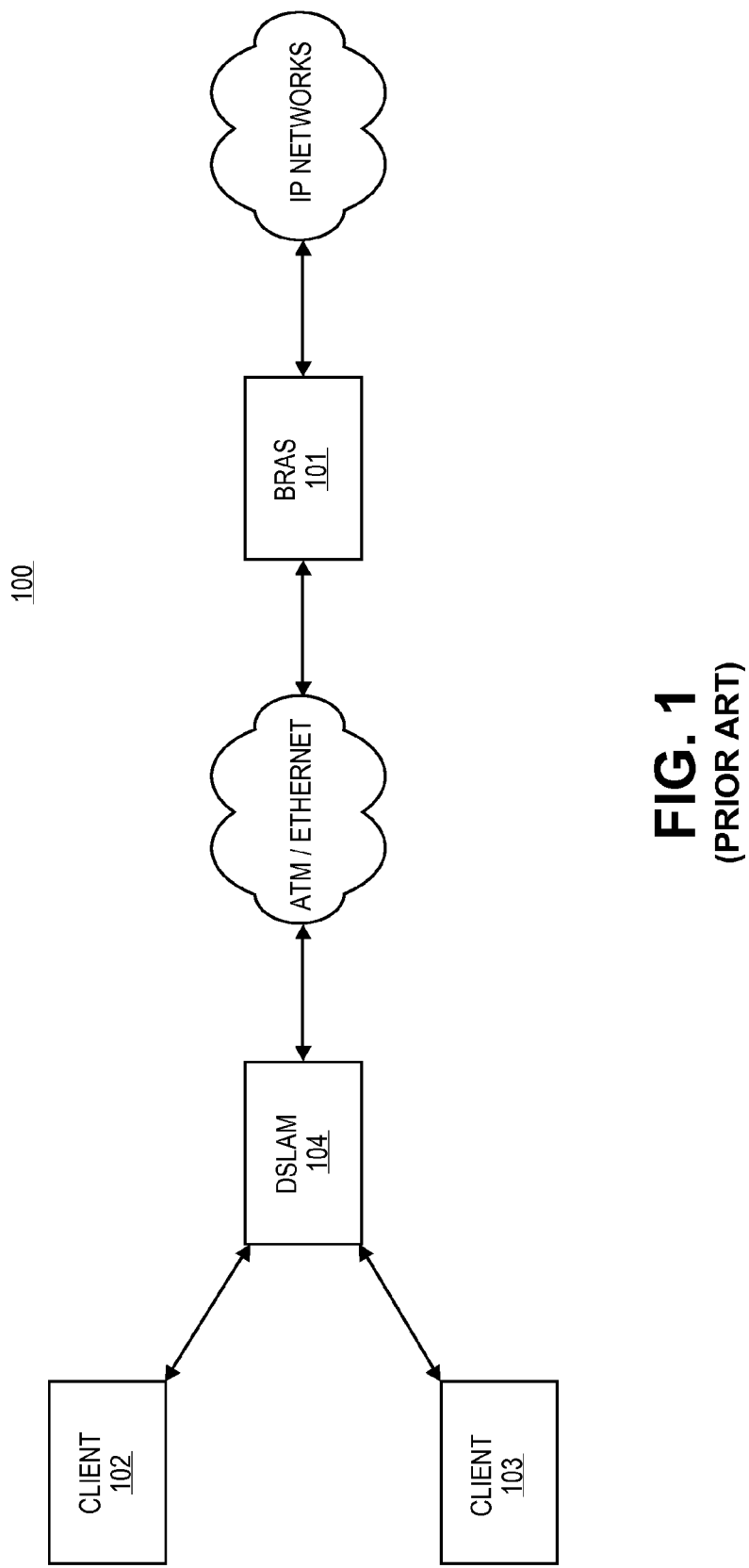
FIG. 1 is a diagram illustrating a typical network infrastructure.

Protocols for messaging between a BRAS and other entities are described. According to one embodiment, a BRAS can communicate information (e.g., multicast group membership and QoS profiles, etc.) to one or more entities downstream (e.g., DSLAM, home gateways, etc.) and/or one or more different types of entities downstream of BRAS can communicate information (e.g., subscriber records, such as port sync, VCI/VPN values, and/or NAPT mappings) with the BRAS. According to one embodiment, the protocols allow a BRAS to transmit one copy of each data packet to each DSLAM requested by the subscribers and to enable the DSLAMs replicate the packet to all subscribers who tune in (e.g., multicast replication is pushed out from the BRAS to the DSLAM). According to another embodiment, the protocols enable DSLAMs to be session aware. An exemplary function built on this capability is to make VOIP packets have higher precedence over other packets from the DSLAMs toward the BRAS.

According to one embodiment of the invention, Quality of service (QoS) information is sent from the BRAS to the downstream entity to be updated by that downstream entity. According to another embodiment, hardware attributes (e.g., port speed) is sent to the BRAS from downstream entities for use in determining how to handle different subscribers.

In one embodiment, the BRAS is retained as a central authentication point. However, subscriber level information may be distributed to other entities, such as DSLAM, home gateway, LAC (layer 2 access concentrator), and distributed BRAS, in a DSL access network. The subscriber level information may include, but is not limited to, multicast group membership and QoS (quality of service) profiles, etc. In addition, according to one embodiment, control data for DSL entities may be uploaded, via the protocols (e.g., subscriber update protocols or SUP), to the BRAS. The control data may be applied to the subscriber records, such as, for example, port sync and VCI/VPI values from a DSLAM, and NAPT mappings from a home gateway.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent finite sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to one or more different apparatuses for performing the operations herein. This apparatus may be specially constructed for the required purposes (e.g., software, hardware, and/or firmware, etc.), or it may comprise a general purpose computer selectively activated or reconfigured by a computer program stored in the computer. The instructions of such software, firmware, and computer programs may be stored in a machine readable medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, electrical, optical, acoustical or other forms of prorogated signals (e.g., carrier waves, infrared signals, etc.) or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
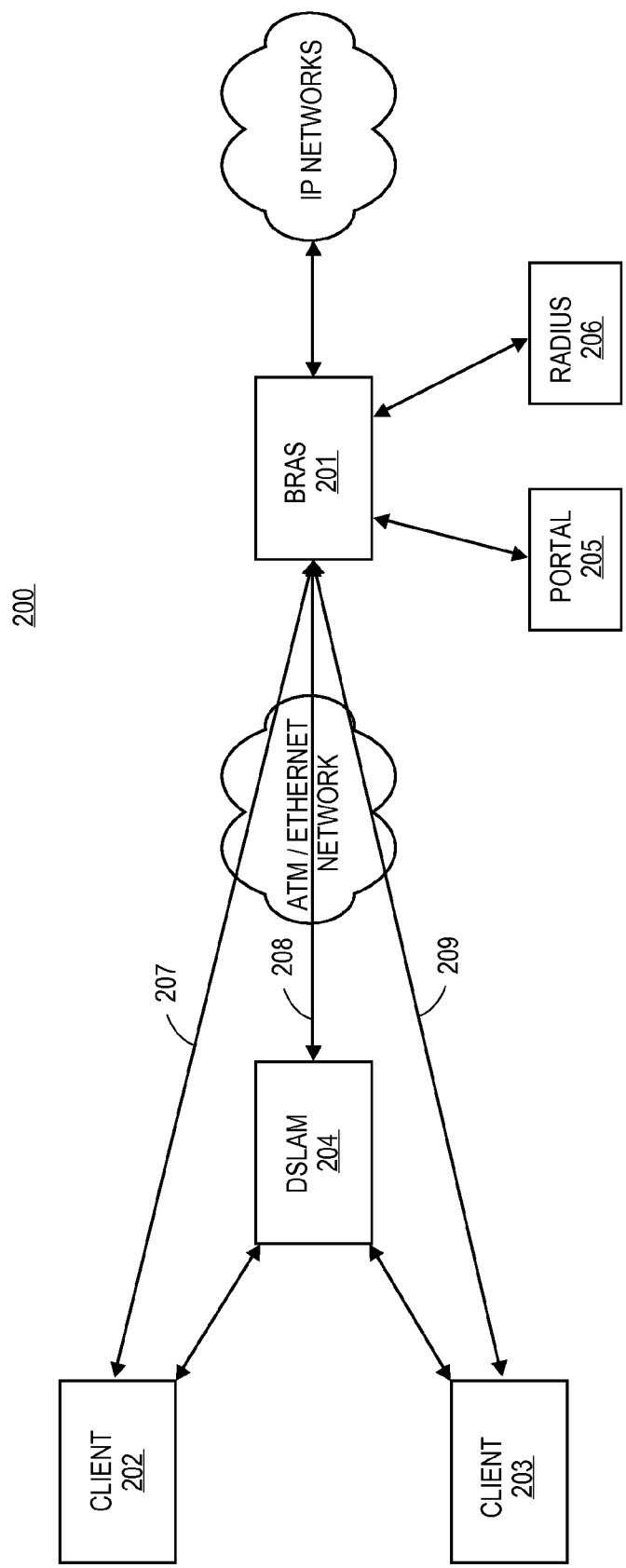
FIG. 2 is a diagram illustrating an exemplary network infrastructure according to one embodiment of the invention.

FIG. 2 is a block diagram illustrating an exemplary network infrastructure having protocol messaging between a centralized subscriber management system (SMS) and other entities, according to one embodiment. Referring to FIG. 2, exemplary infrastructure 200 includes a centralized SMS 201, which may be implemented as a BRAS, coupled to a portal 205 and a RADIUS (remote access dial in user server) database system 206. In addition, unlike a conventional approach, in which subscriber level information is used at SMS 201, the subscriber level information may be distributed to other network entities, such as DSLAM 204 and home gateways 202 and 203. In one embodiment, SMS 201 communicates with other entities (e.g., DSLAM 204 and home gateways 202-203) to exchange subscriber related information, via protocols, also referred to as subscriber update protocols (SUPs), indicated by paths 207-209 respectively.

According to one embodiment, the SUP allows SMS 201 to transmit one copy of each data packet to DSLAM 204 requested by the subscribers (e.g., subscribers 202 and 203) and to enable the DSLAM 204 to replicate the packet to all subscribers who tune in. According to an alternative embodiment, the SUP enables DSLAM 204 to be session aware. An exemplary function built on this capability is to make VOIP packets have higher precedence over other packets from the DSLAM 204 toward the SMS 201.

In one embodiment, the SMS 201 is retained as a central authentication point via, for example, Web portal 205 and RADIUS 206. However, subscriber level information may be distributed to DSLAM 204 and/or home gateways 202 and 203, or other entities, such as LAC (layer 2 access concentrator) and distributed BRAS, in a DSL access network. The subscriber level information may include, but is not limited to, multicast group membership and QoS (quality of service) profiles, etc. In addition, according to one embodiment, control data for DSL entities may be uploaded, via the SUP, to the SMS 201. The control data may be applied to the subscriber records, such as, for example, port sync and VCI/VPI values from DSLAM 204, and NAPT mappings from home gateways 202 and 203, etc. In one embodiment, replication for multicast may occur in DSLAM 204. In addition, QoS profile may be downloaded to BRAS 201. Furthermore, the SUP allows the upload of home gateway NAPT (network address port translation) mappings to BRAS and to support services, such as CLIPS (clientless IP service) for devices that are behind a NAPT.

Figure 3:
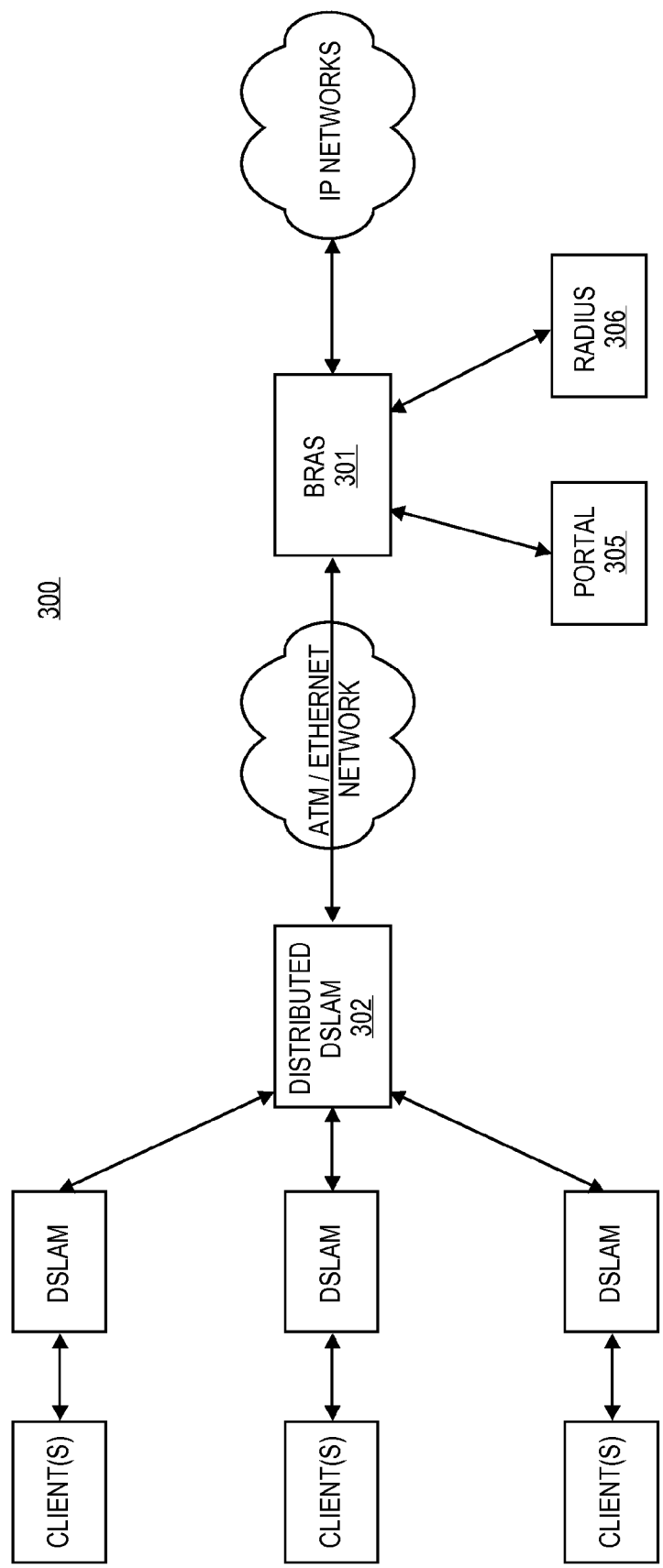
FIG. 3 is a diagram illustrating an exemplary network infrastructure according to an alternative embodiment of the invention.

FIG. 3 is a block diagram illustrating an exemplary network configuration having a distributed BRAS according to one embodiment. In a distributed BRAS environment, referring to FIG. 3, according to one embodiment, centralized BRAS 301 based authentication with subscriber level information may be distributed to the distributed BRAS 302 to allow optimized multicast, etc.

Figure 4:
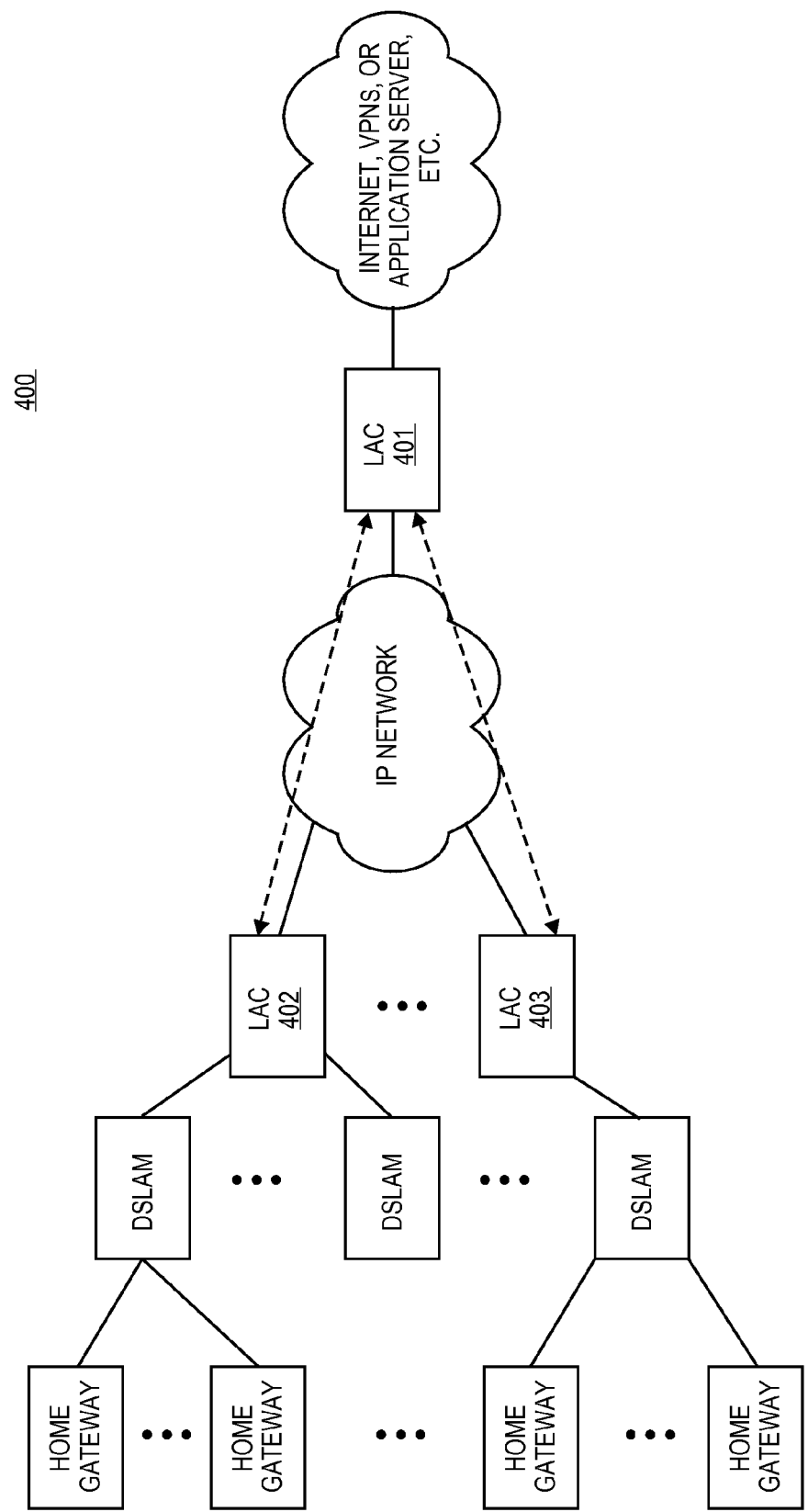
FIG. 4 is a diagram illustrating an exemplary network infrastructure according to another embodiment of the invention.

FIG. 4 is a block diagram illustrating an exemplary LAC-LNS network configuration according to one embodiment. In a LAC-LNS environment, referring to FIG. 4, subscriber level information may be distributed from LNS 401 to LAC 402-403 to support a more optimized multicast and QoS solution. As a result, LAC-LNS capability has been enhanced.

Exemplary Subscriber Update Protocol

Figure 5:
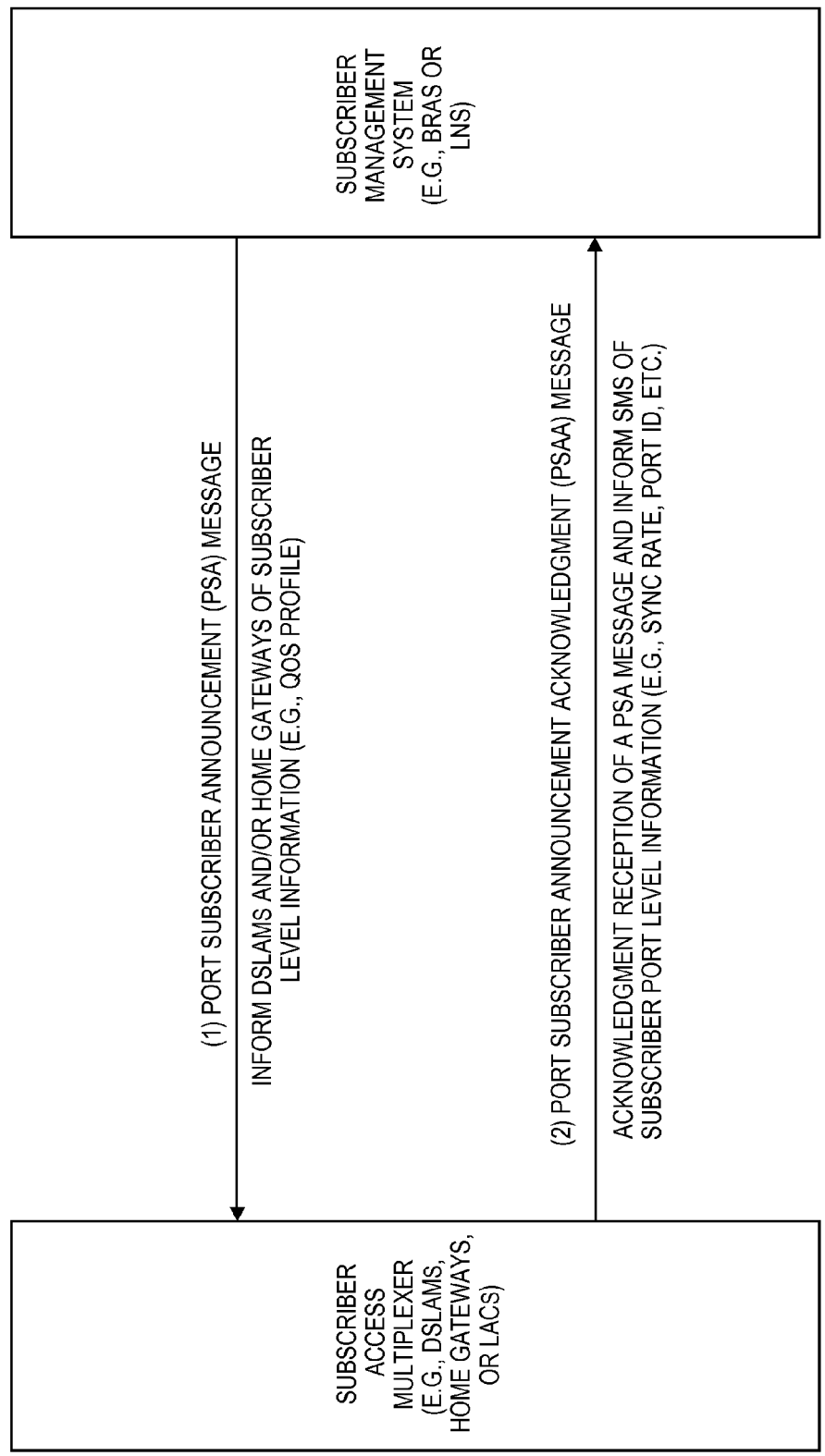
FIG. 5 is a flow diagram illustrating an exemplary protocol used between a centralized network element and other entities according to one embodiment.

FIG. 5 is a diagram illustrating an exemplary SUP according to one embodiment. According to one embodiment, the SUP: 1) uses the traffic manipulation capabilities in the DSLAMs, such as traffic replication and QoS enforcement; 2) maintains the relative ease of network management by not adding to the complexity of the routing or subscriber management infrastructure unnecessarily; 3) is relatively portable across different transports as possible. Of cause alternative embodiments could distribute such operations differently.

In one embodiment, the SUP is designed to make relatively minimal assumptions about the DSLAM's capabilities, other than the replication, QoS, etc. mechanisms that will eventually be performed. For example, a DSLAM may not need to support general IP services (e.g. TCP transport, or IGMP), nor does it need to "snoop" user data. The BRAS handles the multicast protocol actions, such as IGMP (Internet group management protocol) reports, PIM (protocol independent multicast) joins etc, and QoS setup. The BRAS installs the forwarding/replication entries, and QoS setup into the DSLAMs via the SUP mechanism. This allows an SUP capable DSLAM to support the new services by performing only multicast packet/cell replication and local QoS enforcement.

In one embodiment, the SUP allows for relatively simple implementations on the DSLAMs. It requires less maintenance, troubleshooting effort, compared with alternative schemes. Routing and subscriber management related functions are centralized on the BRAS. Such centralized capabilities make it easier to provide consistency in user policies, and to better utilize the overall network resource. The existing network topology can be mostly unchanged to preserve the investment already made by service providers.

According to one embodiment, at least two functions may be implemented as follows:

Let the BRAS set up multicast replication entries on the DSLAMs; and

Let the BRAS send QoS requirements to the DSLAMs.

Following subsections describe the SUP mechanism in Ethernet and in ATM networks for multicast services. Although the scheme for Ethernet is symmetrical to that on the ATM network, there are some differences in the detailed mechanisms. Other types of networks may be applied.

DSLAM Replication Based Multicast Service Over Ethernet Network

An Ethernet/IP based DSLAM usually connects to the BRAS via a layer2 switched network. It is assumed that a subscriber's MAC address is visible to the BRAS and is unique per BRAS. In one embodiment, Ethernet BRAS runs IGMP for the DSL users. The BRAS applies policies to the IGMP reports or leaves, and informs the DSLAMs about their resulting multicast entries. A user's DSL port is identified by its MAC address. The BRAS tells each DSLAM which of its user DSL ports should be added or deleted from which multicast group's replication entry.

In one embodiment, a BRAS may have a few Ethernet interfaces intended for transmitting multicast packets to downstream DSL subscribers. Due to different network design reasons, these ports may or may not be the same ports IGMP reports/leaves come in on. Different implementations of SUP support configurations where: 1) the same port handles both unicast and multicast traffic, and/or 2) separate ports leading to the same DSL users.

Figure 6:
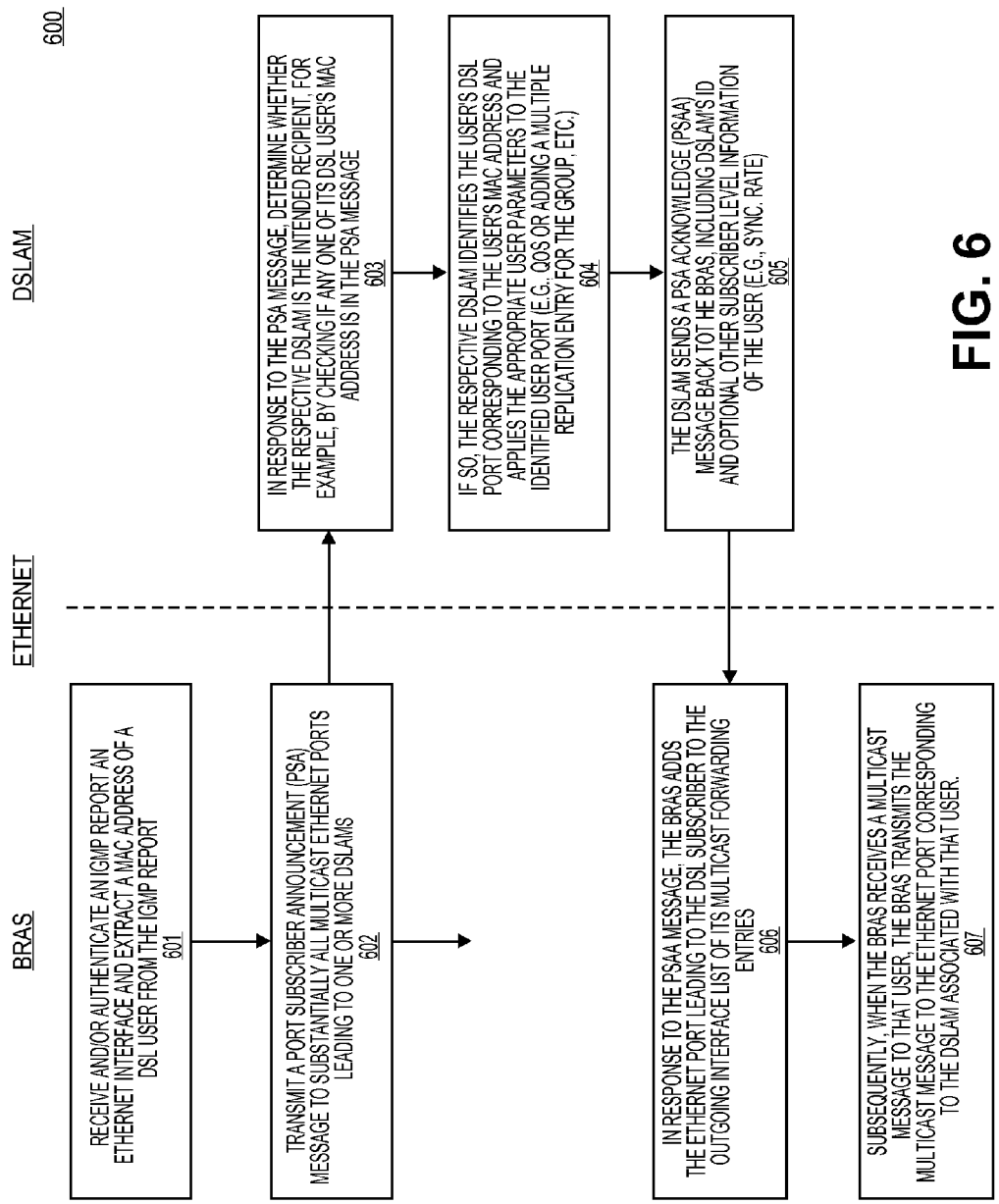
FIG. 6 is a flow diagram illustrating an exemplary process of a SUP over Ethernet, according to one embodiment.

FIG. 6 is a flow diagram illustrating an exemplary process of a SUP over Ethernet, according to one embodiment. The exemplary process 600 may be performed by a processing logic that may comprise hardware (circuitry, dedicated logic, etc.), software (such as is run on a dedicated machine), or a combination of both. Referring to FIG. 6, when a BRAS authenticates or receives an IGMP report from one of its Ethernet interfaces, at block 601, it learns the DSL user's MAC address. At block 602, the BRAS sends an SUP port subscriber announcement (PSA) message, on all multicast Ethernet ports leading to the DSLAMs. The PSA message can contains: 1) the user's MAC address; 2) the multicast group address the user wants to join; 3) the IP address of the BRAS (Note that the BRAS' MAC address is available in the MAC header of PSA message); and 4) Additional control information such as QOS profile.

In one embodiment, when a DSLAM receives a PSA message, at block 603, it checks to see any of its DSL users have the included MAC address. If there is no match the message is discarded (e.g., silently). If a match is found, it may be considered that the PSA message is destined for this DSLAM. At block 604, the DSLAM identifies the user's DSL port, and applies the appropriate user parameters to the user port, such as, for example, applying QoS (quality of service) or adding a multicast replication entry for the group, with the user's port populated in its outgoing port list.

If A DSLAM receives a PSA message destined to it, at block 605, it sends an SUP PSA acknowledgement (PSAA) message to the BRAS. The PSAA contains the information in the PSA message, plus the DSLAM ID and potentially other subscriber level information, such as, for example, the port sync rate. The PSAA also tells the BRAS whether it was capable of completing the operation requested in the PSA message.

In a multicast example, according to one embodiment, when the BRAS receives the PSAA message, at block 606, it adds the Ethernet port leading to the DSL subscriber to the outgoing interface list of its multicast forwarding entry. As an optimization, the BRAS can maintain the mapping between the user's MAC address and the DSLAM ID or the multicast Ethernet ports leading to the DSL subscribers. At block 607, subsequent PSA messages will only need to be sent down on the multicast Ethernet port leading to the DSL subscriber.

When an IGMP leave is received by the BRAS from the last user on a DSL port, the BRAS sends a PSA message to the DSLAM, with the same set of information, except to tell it to remove the DSL port from its multicast replication entry. When the DSLAM has pruned off all outgoing DSL ports from a multicast replication entry, it may send IGMP leaves toward the BRAS. This stops the layer 2 switches from sending it unwanted traffic.

Finally, in one embodiment, when a PSA message is not positively acknowledged, the BRAS may update the subscriber's accounting record for this failure, or send alarms. No further SUP-triggered action will take place to "fix" such failures.

According to one embodiment, a BRAS can use PSA messages to inform the DSLAMs to add or delete a DSL port from a multicast replication entry and/or the DSLAM about other subscriber level information, such as, a QoS profile.

In one embodiment, messages regarding multicast replication entries may contain the user's MAC address, multicast group address, the BRAS's IP address, as a bit indicating whether it is a add or delete operation. This message addresses to a well-known multicast address. At the IP layer, this could be the all systems address 224.0.0.1. At the Ethernet layer, this could be an Ethernet broadcast message, or a dedicated multicast address.

According to one embodiment, a DSLAM may send a PSAA message to a BRAS in response to a PSA message destined to it. This message contains all fields in the PSA message, plus a DSLAM ID and a bit telling whether the requested operation succeeded, plus potentially other subscriber level information such as user port sync rate. This message is unicast addressed to the BRAS.

The DSLAM ID and BRAS' IP address contained in the messages may be used for management, service accounting or diagnostic purposes. While awaiting a response of PSAA message, the BRAS may retransmit the PSA messages every predetermined time period, such as PSA_Retrans_Timer seconds. If no PSAA is received after a predetermined number of messages, such as MAX_PSAA_COUNT messages, the BRAS may consider the operation has failed.

Exemplary DSLAM Based Replication Service Over ATM Network

In an ATM based DSLAM-BRAS network, according to one embodiment, dedicated multicast PVCs (permanent virtual circuits) need to be pre-established between the BRAS and the DSLAMs. The SUP scheme requires a DSLAM to announce its customer PVC numbers to a BRAS. The BRAS runs IGMP and informs the DSLAM of the binding between the customer's PVC or DSL port and the multicast PVC. For each multicast channel, the BRAS sends only one copy of each data packet to each DSLAM. The DSLAM replicates multicast ATM cells to all attached DSL subscribers, according to the multicast replication state maintained locally.

In one embodiment, the DSLAM maintains one dedicated PVC to each DSL modem for each TV channel (e.g., one multicast group) the DSL subscriber tuned into. For DSL subscribers viewing more than one channel substantially simultaneously (multiple TV sets or P.I.P), multiple multicast PVCs need to be established to the DSL modem, with each PVC dedicated for one multicast group (plus one or more PVCs for unicast data traffic and services).

The multiple-PVC-between-the-DSLAM-and-DSL-modem design choice is made based on the assumption that it is more expensive for a DSLAM to perform AAL5 (ATM adaptation layer 5) PDU (protocol description unit) reassembly before replication. Otherwise, the DSLAMs can avoid interleaving AAL5 cells from different multicast channels, and only need to establish one multicast PVC to each DSL modem for all multicast channels.

Figure 7:
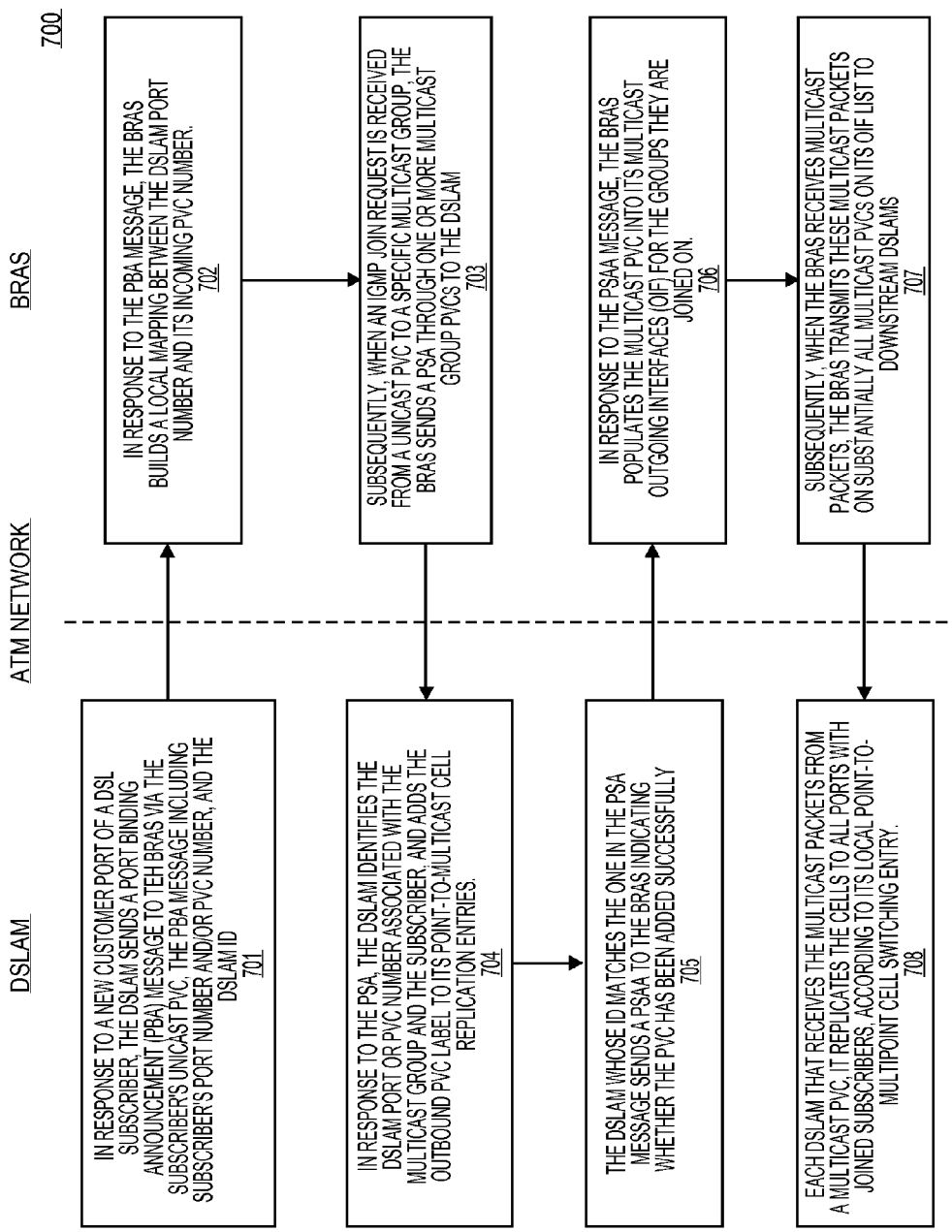
FIG. 7 is a flow diagram illustrating an exemplary process of a SUP over ATM, according to one embodiment.

FIG. 7 is a flow diagram illustrating an exemplary process of a SUP over ATM, according to one embodiment. The exemplary process 700 may be performed by a processing logic that may comprise hardware (circuitry, dedicated logic, etc.), software (such as is run on a dedicated machine), or a combination of both. Referring to FIG. 7, at block 701, when a customer port comes up, the DSLAM sends the BRAS a Port Binding Announcement (PBA) message, through the subscriber's unicast PVC to the BRAS. In one embodiment, the PBA contains the subscriber's port or PVC number and the DSLAM ID. In response to the PBA message, at block 702, the BRAS builds a local mapping between the DSLAM port number and its incoming PVC number. According to one embodiment, the DSLAM may transmit the initial PBA message a few times, as is done in IP gratuitous ARP, to reduce the likelihood of message loss.

Subsequently, at block 703, when a BRAS receives an IGMP join request from a unicast PVC to a specific multicast group, it sends a PSA message through one of the multicast group PVCs to the DSLAM. Similar to the actions in an Ethernet DSLAM, at block 704, the ATM DSLAM can identify the DSLAM port or PVC associated with this multicast group and the subscriber. In addition, the DSLAM adds the outbound PVC label to its point-to-multipoint cell replication entry. One additional field "DSLAM ID" is included in the PSA message for ATM DSLAMs.

It is possible that a BRAS can miss all initial PBA messages from a DSLAM. This could be due to BRAS restarted, or other reasons. When such a BRAS receives an IGMP join, it cannot find the DSLAM port mapping for the subscriber. According to one embodiment, this DSLAM may send a Port Binding Request (PBR) message to the DSLAM, through the unicast PVC. In one embodiment, the DSLAM that received the PBR may reply with a PBA message. According to one embodiment, the BRAS may retry the PBR message at pre-set intervals, until a PBA message is received, or a predetermined maximum retry count is reached.

In one embodiment, when the BRAS sends the PSA message, it may need to send to multiple multicast PVCs leading to different DSLAMs. Since the PSA message contains the DSLAM ID, a receiving DLSAM can match on its own DSLAM ID. If it is the intended recipient of the PSA message, at block 705, it sends a PSAA message to the BRAS, acknowledging the receipt and tells whether the request VC addition or deletion is successful.

In response to the PSA message, at block 706, these multicast PVCs, instead of the DSL subscriber's unicast PVCs, are populated as multicast outgoing interfaces (OIF) for the groups they are joined on. Note that with ATM point-to-multipoint PVC, a reverse channel is available from each receiver to the sender, and is point-to-point (P2P). The PSAA is sent over this reverse P2P channel to the BRAS. The BRAS populates the multicast PVC as an OIF upon receiving the PSAA, if it is not already populated.

In one embodiment, when multicast data packets for a group arrive at a BRAS from the upstream, at block 707, the BRAS uses the usual replication mechanism and transmits these packets on all multicast PVCs on its OIF list. All downstream DSLAMs with users joined will receive a copy of each ATM cell. When a DSLAM receives these cells from a multicast PVC, at block 708, it replicates the cells to all ports with joined subscribers, according to the DSLAM's local point-to-multipoint cell switching entry.

When the BRAS deletes an IGMP member for a user on a group, according to one embodiment, the BRAS sends the DSLAM an PSA message via the multicast PVC for the group to be pruned. This PSA has the port deletion indication turned on. The receiving DSLAM replies with a PSAA message. When the last user of this group on a DSLAM withdraws, the DSLAM knows the multicast PVC is no longer used for cell forwarding.

If the BRAS fails to build a mapping of the DSLAM ports to a DSL user, it falls back to use the unicast PVC also for multicast. The BRAS replicates a copy of each multicast packet itself to the DSL subscriber.

Exemplary SUP Messages for ATM Networks

In one embodiment, almost all SUP messages need to be transmitted inside AAL5 PDUs. They could be transported inband through the specified PVCs, or via other mechanisms specifically designed for such signaling purpose. When inband signaling is used, certain embodiments may use one of the PTI bits or code points in the ATM cell header, to flag the need to consume the cell locally. Alternative embodiment could use a variety of other techniques. For ATM networks, the SUP messages are similar to those describe for the Ethernet DSLAMs. With one addition.

1) Port Subscriber Announcement (PSA) Message.

In one embodiment, two fields are different from the PSA used for Ethernet DSLAMs, it has DSL subscriber port number or PVC number on DSLAM, in place of the user's MAC address. It includes the DSLAM ID which BRAS learned from PBA message.

2) Port Subscriber Announcement Acknowledgement (PSAA) Message.

In one embodiment, this message contains all fields in the PSA message, plus a bit telling whether the requested operation succeeded. This message is transmitted on the point-to-multicast PVC, from the DSLAM to the BRAS, in a point-to-point manner.

3) Port Binding Announcement (PBA) Message.

In one embodiment, this message is used by DSLAM to announce its local port number or PVC for a DSL subscriber to the BRAS. This message is transmitted inside the DSL subscriber's unicast PVC. The BRAS builds a mapping between the BRAS PVC and the DSLAM's PVC for the same subscriber. This message contains the subscriber's port number or PVC, and DSLAM ID.

4) Port Binding Request (PBR) Message.

In one embodiment, this message is used by a BRAS to ask a DSLAM to send its port binding for a DSL subscriber. This is done when the BRAS missed the initial PBA message from the DSLAM. Note that in order for the DSLAM to transmit the PBA message, especially in response to a PBR message, the DSLAM needs to be able to identify the last cell of a PDU in the existing PVC, and be able to cache user's cells while transmitting the inserted PBA cells.

In one embodiment, a SUP protocol for ATM networks uses the ATM inband signaling, i.e. the ATM data traffic and the signaling cells are using the same PVC between the BRAS and the DSLAM. For example, using a bit from the ATM PTI field in the ATM cell header to flag a signaling cell from the data traffic, and DSLAM hardware/firmware modification to process such an inband signaling cells.

An Alternative Scheme Using Outband SUP for ATM Networks

In one embodiment, an alternative embodiment (that does not use an ATM bit and DSLAM hardware/firmware modification to process such inband signaling cells) is to use an outband signaling PVC between the BRAS and DSLAM. In this scheme, one PVC may be pre-built between the BRAS and DSLAM to be used for SUP signaling. The unicast PVC and multicast PVCs are used only for data traffic.

In this outband signaling scheme, the BRAS has the knowledge of DSLAM port to local PVC mapping, it also has the knowledge of DSLAM ID of all the PVCs, either by static configuration or by learning from RADIUS (remote access dial in user server) during subscriber authentication. Thus PBA and PBR messages may not needed. In this scheme, the DSLAM has the knowledge of all the multicast PVC associated with which multicast groups, this can be done a variety ways (e.g., by static configuration on the DSLAM).

In one embodiment, when a BRAS receives an IGMP join from a unicast PVC to a specific multicast group, it sends a PSA (port subscriber announcement) message through the outband signaling PVC to the DSLAM. Since it already knows the DSLAM ID of the subscriber PVC and the DSLAM ID of the outband signaling PVC, it does not need to send to multiple PVCs as described above. Upon receiving the PSA on DSLAM, the DSLAM sends a PSAA message back to the BRAS to acknowledge the status.

Since the DSLAM has the knowledge of the group number of the multicast PVCs, it can populate the replication entry for the multicast group and port number indicated in the PSA message. The SUP messages of PSA and PSAA are the same as in described above.

Exemplary Multicast Packet Encapsulation with ATM Cell based DSLAM

In one embodiment, since BRAS only sends one multicast stream per group to a DSLAM which has subscribers joining the group, it's up to the DSLAM to replicate the multicast packet/cell to each subscriber. In the case of PPPoE (P2P protocol over Ethernet), PPPoEoA (PPP over Ethernet over ATM) or IPoE (IP over Ethernet), a BRAS only needs to put on Ethernet encapsulation for the multicast packets and send to DSLAMs, there need not be modification of the DSLAM to do either for the packet or cell based replication. This assumes the CPE device or subscriber's PC can receive multicast packets outside the PPP interface.

In the case a DSLAM has both PPPoEoA and IPoA subscribers, according to one embodiment, BRAS may pre-build two multicast PVC per group to the DSLAM. The PSA message is sent through either the Ethernet based multicast PVC, or the IP based multicast PVC. In the ATM outband signaling scheme, the encapsulation type needs to be included in the PSA message.

In the case of subscriber's connection is PPPoA or PPPoAoE, if it is not feasible to send Ethernet or IP encaped multicast packets to the subscriber, the generic encapsulation is possible, such as HDLC (high-level data link control), may be selected if it is available. If it is not available, then certain embodiments pass PPP session information in the PSA to the DSLAM to enable DSLAM "customizing" the PPP encapsulation of multicast data for each subscriber.

Exemplary SUP for Multicast Services in IP Networks

In one embodiment, if the SUP client is IP capable and SUP server and client are not directly connected with layer2 switched networks, SUP can also be applied using IP tunneling. For example, in the case of L2TP (layer 2 tunneling protocol) tunneling, LAC (L2TP access concentrator) and LNS (L2TP network server) are connected through IP routed networks. When many subscribers from the same LAC join the same multicast group on the LNS, it saves the bandwidth to have the LNS send only one multicast stream of the group to the LAC, and let the LAC perform the replication there.

This topology is symmetrical to the BRAS and DSLAM scheme in terms of using SUP for multicast application. The scheme does not require any changes to the L2TP protocol, there will not be extra L2TP sessions for multicast groups, the signaling is identical to the BRAS and DSLAM case. In most of the cases, LAC is also an IP device and there is IP connectivity between the LAC and LNS.

Thus an IP tunnel, such as a GRE (generic routing encapsulation) tunnel, may be used to facilitate both the signaling and multicast data traffic. For example, one pre-built GRE tunnel may be provided between each LAC and its LNS device. This GRE tunnel may be considered the same as the point-to-point Ethernet link in the BRAS/DSLAM case. This GRE tunnel will be used for SUP signaling between the LSN and LAC, and also the LNS will use it to send all the multicast traffic to the LAC.

Figure 8:
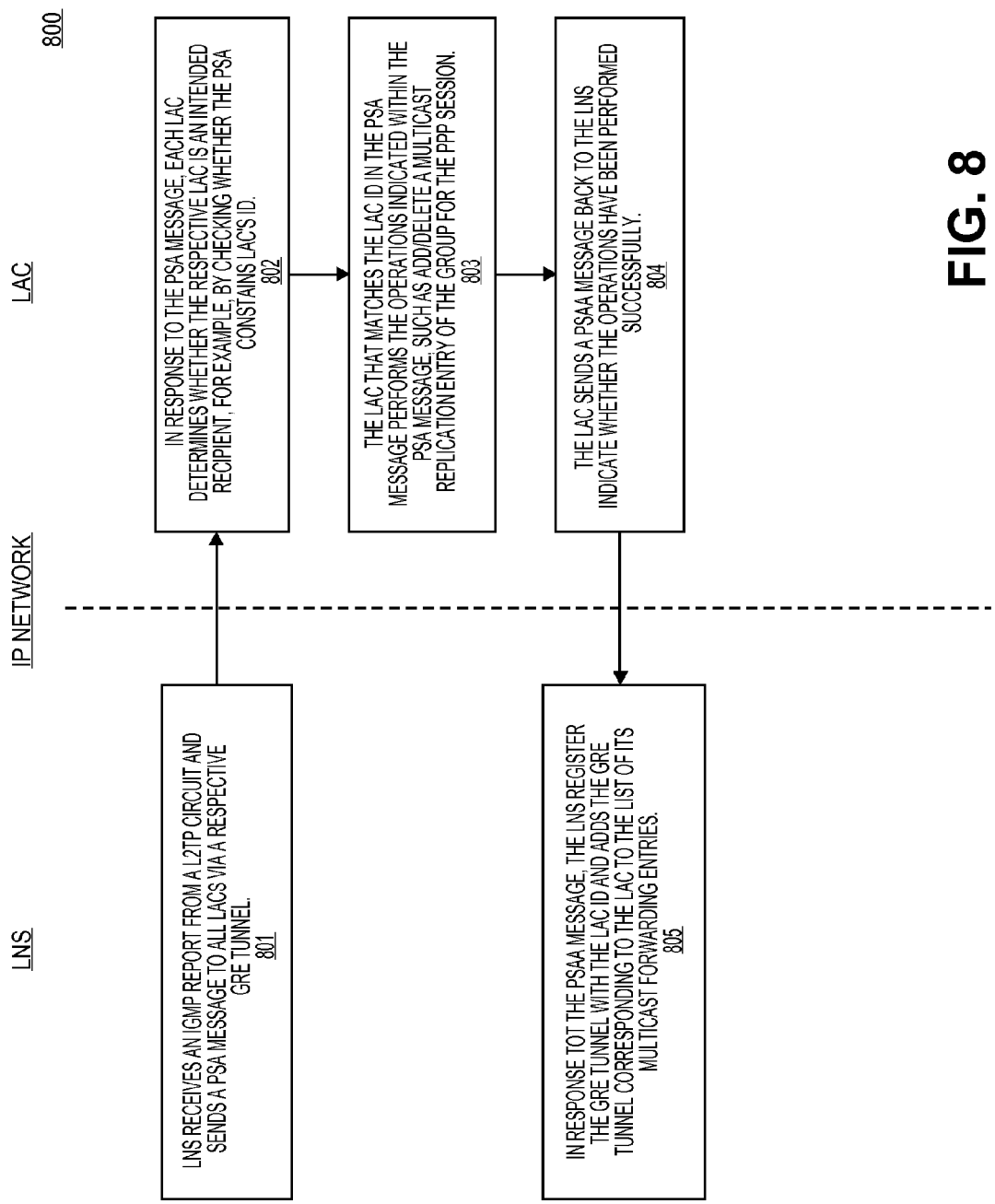
FIG. 8 is a flow diagram illustrating an exemplary process of a SUP over IP network according to another embodiment.

FIG. 8 is a flow diagram illustrating an exemplary process of a SUP over IP network according to another embodiment. The exemplary process 800 may be performed by a processing logic that may comprise hardware (circuitry, dedicated logic, etc.), software (such as is run on a dedicated machine), or a combination of both. In one embodiment, when a LNS receives an IGMP report from one of its L2TP circuits, it knows the PPP session number and which LAC the PPP connection is from. At block 801, the LNS may send a PSA message through the GRE tunnels to all the LACs. In one embodiment, the PSA message includes the subscriber's PPP session ID, the multicast group address, and the LAC ID this PPP session is from, and a bit to indicate whether this is a add or delete operation.

Upon receiving the PSA from the LNS, at block 802, each LAC determines whether the respective LAC is an intended recipient, for example, by checking the PSA contains an LAC ID that matches its LAC ID. At block 803, the LAC which has the same LAC ID as in the PSA message may add or delete a multicast replication entry of this group for the PPP session. At block 804, the LAC may send back a PSAA to the LNS through the same GRE tunnel to acknowledge the operation has succeeded or failed. The LACs whose LAC ID does not match may discard the PSA packet received. In response to the PSAA message, at block 805, the LNS may register the GRE tunnel with the LAC ID and adds the GRE tunnel leading to the LAC on the list of its multicast forwarding entry.

In one embodiment, the SUP messages are similar to the Ethernet or ATM in the DSLAM cases, but it only needs to have messages PSA and PSAA. It uses PPP session ID instead of MAC address, it uses LAC ID instead of DSLAM ID. The SUP scheme can be cascaded along multiple networks. For example, while using SUP in the LNS and LAC based L2TP network for intelligent multicast services, in that case the LAC is an SUP client; But the same LAC device can also be the SUP server while using SUP in the BRAS and DSLAM access network for the multicast service at the same time.

Exemplary Remote Multicast Replication (RMR) Protocol

The deployment and provisioning of multicast services must satisfy certain network design constraints in the last mile. It is common for a network design to have a small set of intelligent layer 3 devices (controllers) and a larger set of simpler layer 2 devices (aggregators). The controllers handle routing, user authentication and access control etc. They are connected via a network to the aggregators closer to the clients. Special design is needed to support multicast over this network.

According to one embodiment, the RMR protocol reduces or removes duplicate multicast traffic in between the controllers and the aggregators. The RMR protocol is independent of layer 2 technology and topology being used.

IP multicast is believed to be a service enabler for video or TV over IP applications. The deployment or provisioning of these services must satisfy certain network design constraints. One common network design is to put all the intelligence in a smaller set of devices, such as a GGSN (gateway GPRS support node) device (e.g., a controller), and traffic aggregation or grooming capabilities in a larger number of more geographically distributed devices (e.g., client aggregators), such as the SGSNs (serving GPRS support nodes). When multicast is introduced, the network bandwidth utilization is improved in all part of the network, except in between the controllers and the aggregators.

In one embodiment, the RMR reduces or removes duplicate multicast traffic in between the controllers and the aggregators. RMR employs a few dedicated messages for the controllers to inform or update the aggregators about changes in multicast forwarding state for each client. It allows the aggregator to replicate from a single incoming multicast packet stream to all its clients that need a copy of that stream. By supporting RMR, the aggregators can perform multicast replications, without supporting any routing functions, or user authentication, billing functions. An aggregator is also referred to as a replicator.

The need to perform remote replications exists in a wide range of networks, including GPRS (general packet radio service) wireless networks across GTP (GPRS tunneling protocol) tunnels, bandwidth wholesale networks between the LNS and LAC of a L2TP tunnel, or between a BRAS and the DSLAMs, etc. Instead of designing similar mechanisms differently for each of these scenarios and add similar extensions to each of those protocols, RMR may be used as a generic mechanism. This reduces the duplicate efforts in designing and debugging similar functions in different protocols, and preserves the investment in implementation and deployment across technology upgrades.

In one embodiment, the RMR decouples multicast remote replication from the layer 2 technology, allowing significant flexibility in network design. For example, in an L2TP setup, an operator can optionally direct unicast traffic through an L2TP tunnel and multicast sessions through GRE tunnels over a different physical interface to the replicators. Such flexibility allows a network provider to optimize the multicast distribution paths and better utilize the existing network. There is relatively little restriction on where or over which path the multicast sources have to be injected into the network. RMR does not require the aggregators to be IP routing devices, which avoids large increases in the number of managed routing devices. This helps to scale network routing, and keep the core network more stable.

Figure 9:
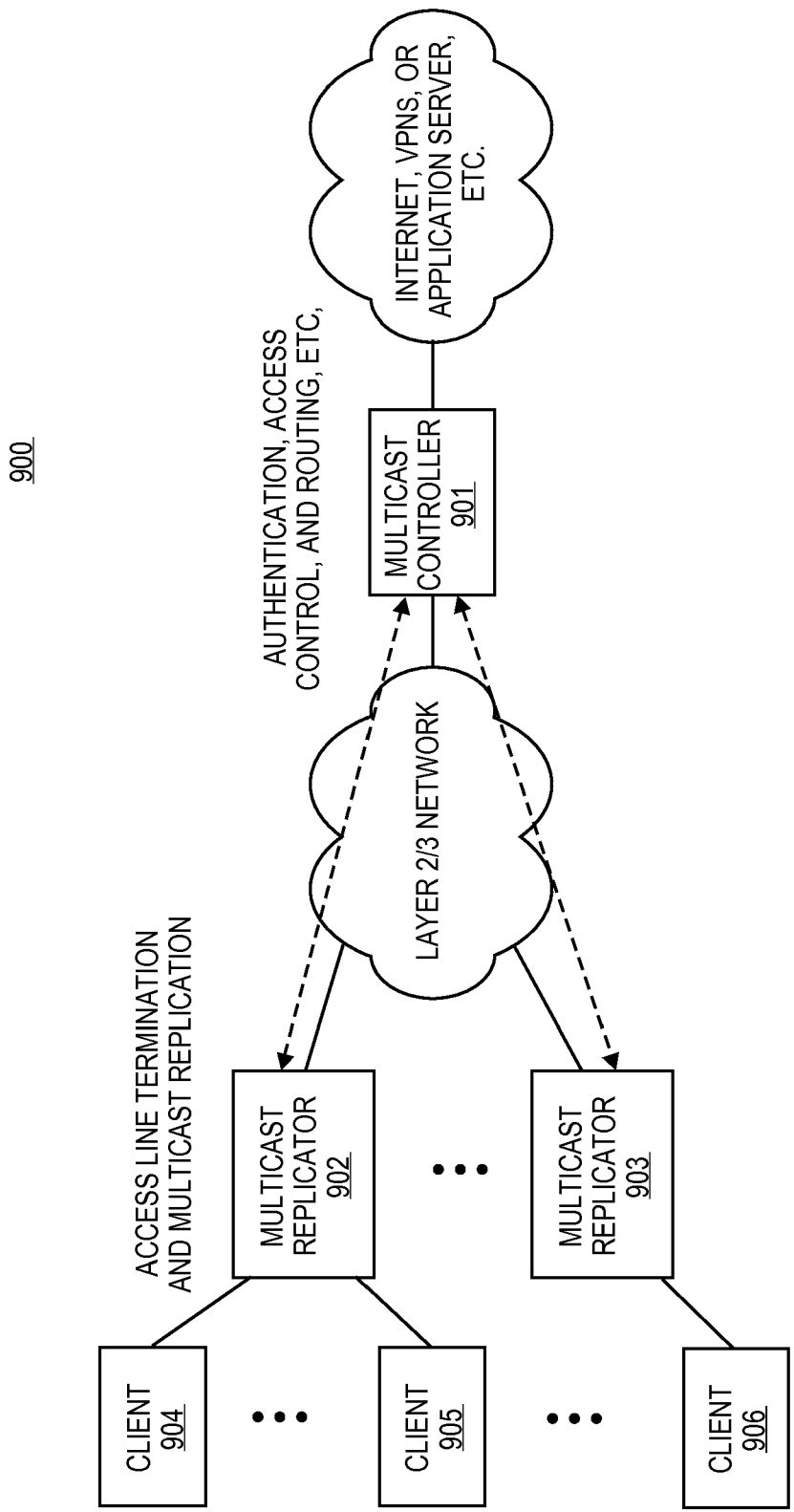
FIG. 9 is a block diagram illustrating an exemplary network configuration according to another embodiment of the invention.

FIG. 9 is a block diagram illustrating an exemplary network configuration according to another embodiment of the invention. Referring to FIG. 9, the MC (multicast controller) 901 is usually an IP capable device, performing routing, user authentication, access control, and billing functions. The MRs (multicast replicators) 902-903 are lower cost layer 2 devices, capable of multicast replication and other minimal IP level functions. For network access control reasons, the clients 904-906 cannot talk directly to each other, and must go through the MC 901. The MC 901 is usually connected to the MR's 902-903 via a layer 2 or 3 network. In one embodiment, the MC 901 runs IGMP and PIM. Each MR will have an administratively assigned ID, by which the MC can use to address it.

Figure 10:
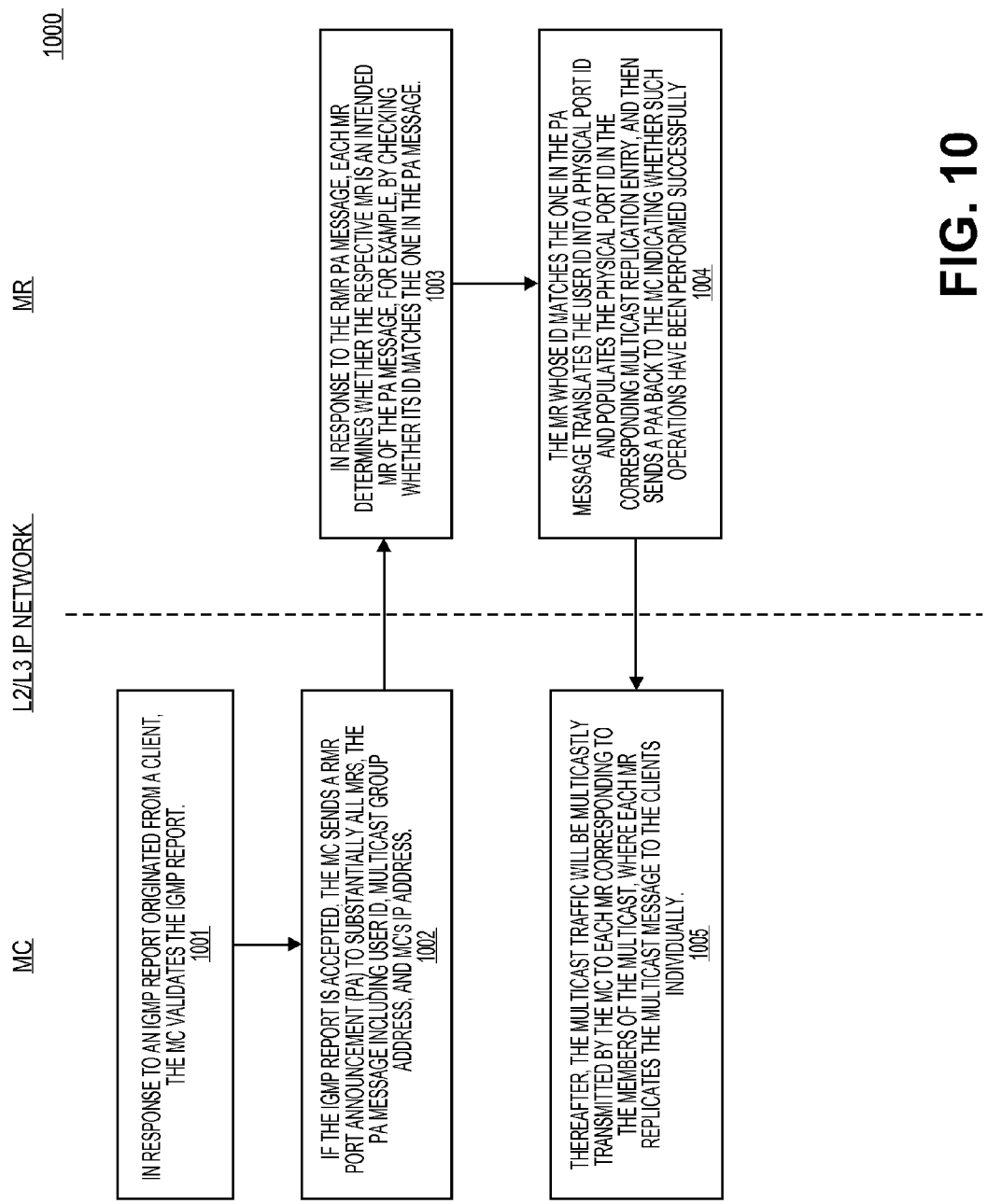
FIG. 10 is a flow diagram illustrating an exemplary process for processing multicast messages according to one embodiment.

FIG. 10 is a flow diagram illustrating an exemplary process for processing multicast messages according to one embodiment. The exemplary process 1000 may be performed by a processing logic that may comprise hardware (circuitry, dedicated logic, etc.), software (such as is run on a dedicated machine), or a combination of both. Referring to FIG. 10, when an IGMP report originated by a client is passed through its MR and received by the MC, at block 1001, the MC learns a unique identifier about this client (e.g., the MAC address of the client, or another identifier in the IGMP packet encapsulation header). The MC validates this IGMP report, possibly through its network policy management component.

If this IGMP report is accepted, at block 1002, the MC sends a RMR Port Announcement (PA) message toward the MRs. In one embodiment, the PA message includes at least the following information:

The user ID that the MR can identify the client with;
The multicast group address, or (source, group) address pair the client needs to join;
The EP address of the MC.

In response to the PA message, at block 1003, each MR checks if the user ID belongs to one of its clients. If there is no match, the PA message is discarded (e.g., silently). If a match is found, the PA message is destined to this MR. At block 1004, the MR translates the user ID into the physical port ID the client is connected to, and populates that port in the corresponding multicast replication entry.

After a MR completes processing a PA message destined to it, it sends a PA Acknowledgement (PAA) message to the MC. The PAA message includes substantially all information in the PA message, plus the MR's ID, and the port ID. The PAA also tells the MC whether it was capable of performing the operation requested by the PA message.

If the MC is on a multicast forwarding path, the MC adds the interface toward the MR to its (*,G) or (s,G) forwarding entry's outgoing interface list. When this stage is completed, at block 1005, multicast traffic will be multicast transmitted by the MC to each MR with members, and replicated to all clients by their MRs. Note that the MC's outgoing interface may not be the same interface where the IGMP report is received for that user.

As an optimization, according to one embodiment, the MC can maintain the mapping between the client's ID and the MR's ID. Subsequent PA messages will only need to be sent directly to the specific MR. When an IGMP leave request is received by the MC from the last client on a MR port, the MC sends a PA message to the MR, with the same set of information that was sent when it joined, except one bit field to signal the removal of the MR port from its multicast replication table. While awaiting a PAA response message from a MR, the MC should retransmit the PA message in a predetermined interval. It may consider the request failed if a predetermined maximum number of retries were done and no response is received from a MR. When a PA message is not positively acknowledged, the MC should update its client's accounting record for such failure, or trigger alarms.

Exemplary RMR Message Formats

In one embodiment, the RMR messages are encoded inside the UDP over IPv4, destined to a well-known port number RMR-PORT, which may be assigned by IANA (Internet Assigned Numbers Authority). The messages are encoded in a type-length-value (TLV) fashion. Multiple TLVs can be packed into the same UDP packet. Each TLV can also optionally contain multiple sub-TLVs.

Figure 11:
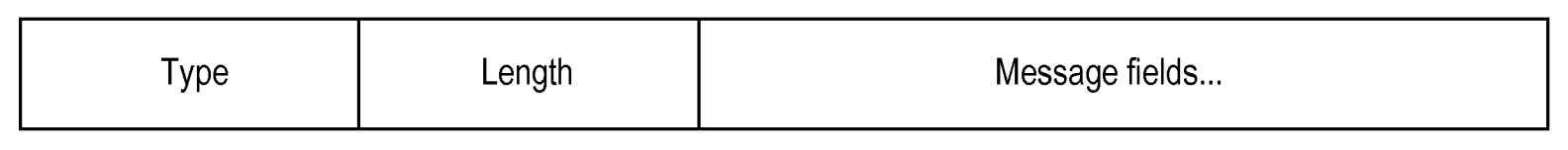

FIG. 11 shows an exemplary RMR message according to one embodiment. In one embodiment, the message type values may be defined as follows:

| | |
|---|---|
| 0-16: | Reserved. |
| 17: | Port Announcement (PA) message. |
| 18: | Port Announcement Acknowledgement (PAA) message. |
| 19: | Authentication message. |

A Multicast Controller uses a PA message to inform a Multicast Replicator to add or delete a client port from a multicast replication entry.

Figure 12:
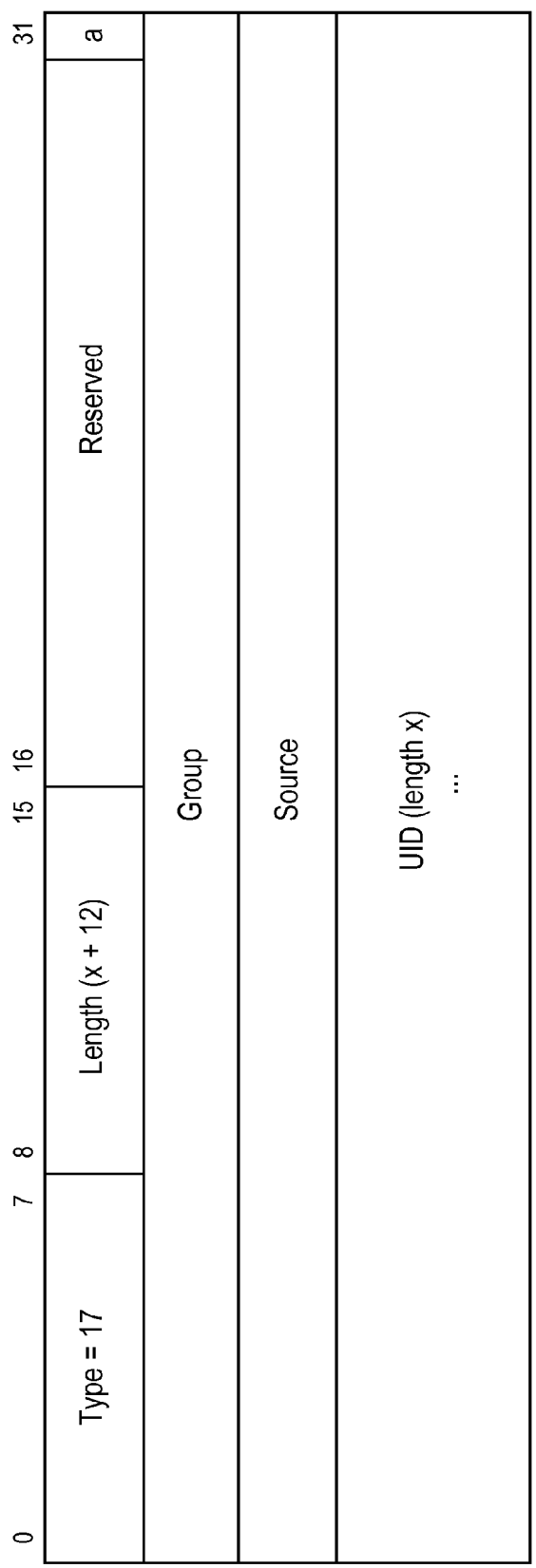

FIG. 12 shows an exemplary PA message for multicast according to one embodiment. The parameters may be defined as follows:

| | |
|---|---|
| Length: | Length of the entire message, e.g., x + 12, where x is the UID's length. |
| Reserved: | Set to 0 on transmission. Ignored on reception. |
| a: | 1 Request is to add client port to replication table.<br>0 Request is to delete client port. |
| Group: | IP multicast Group address |
| Source: | Source address |
| UID: | User ID for sub-TLV |

Figure 13:
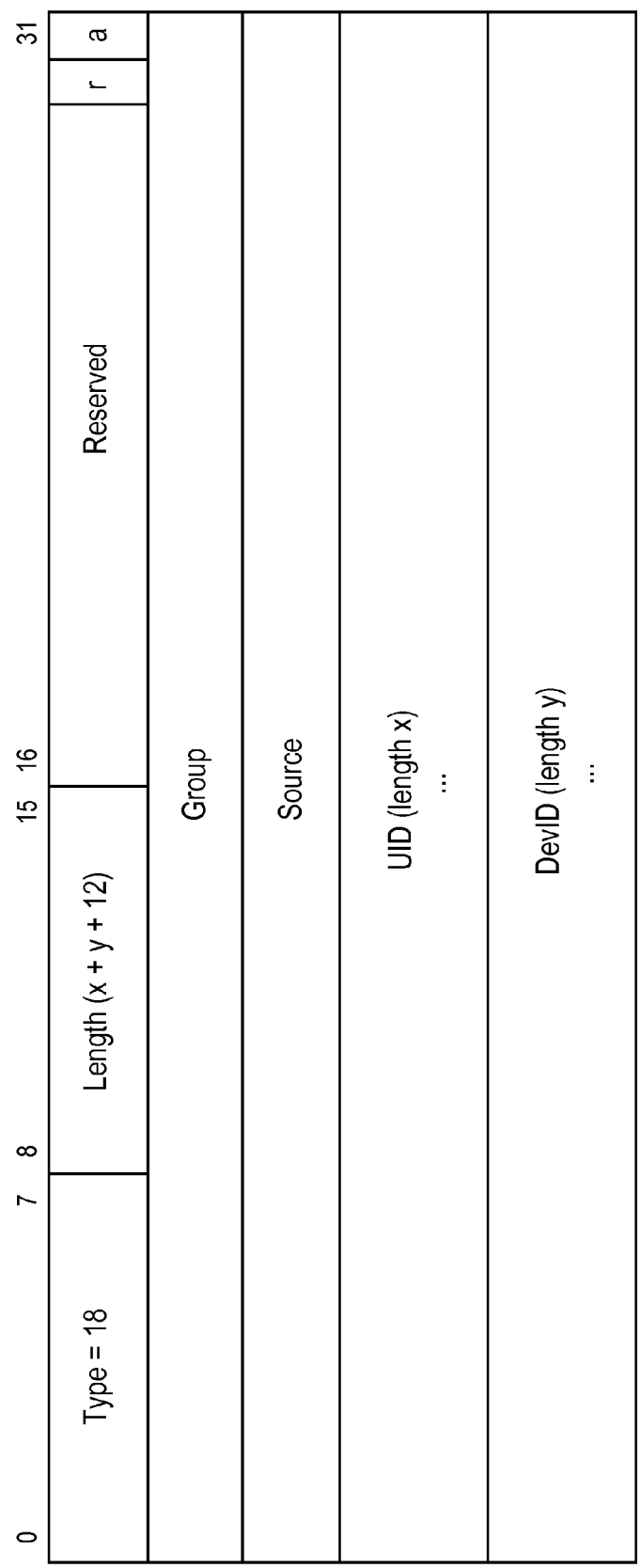

FIG. 13 is a diagram illustrating an exemplary RMR port announcement acknowledgement (PAA) message according to one embodiment. A multicast replicator sends this message to a multicast controller, in response to a Port Announcement message destined to it. This message is unicast addressed to the Multicast Controller. The parameters for the RMR PAA message may be defined as follows:

| | |
|---|---|
| Length: | Length of the entire message. I.e. x + y + 12, where x is the UID's length and y is the DevID's length. |
| Reserved: | Set to 0 on transmission. Ignored on reception. |
| a: | 1 Request is to add client port to replication table.<br>0 Request is to delete client port. |
| r (Result) | 1 requested action is performed successfully.<br>0 requested action is not performed. |
| Group: | IP multicast Group address |
| Source | Source address |
| UID: | User ID for sub-TLV |
| DevID: | MR device ID sub-TLV. |

Figure 14:
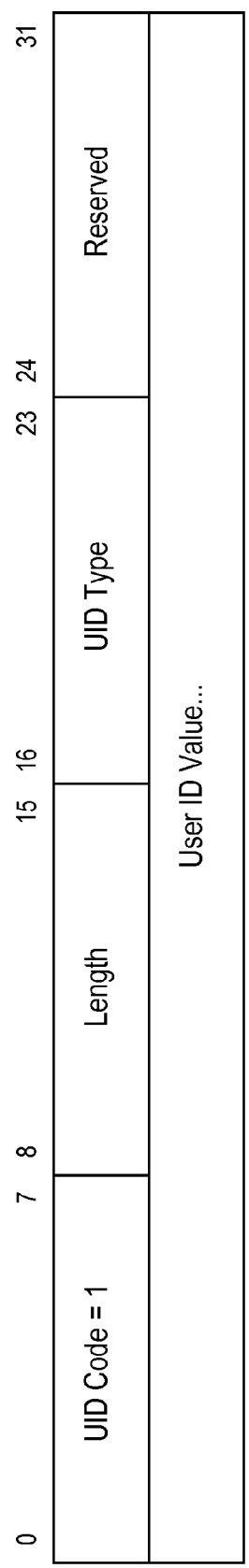

FIG. 14 is a block diagram illustrating an exemplary user ID message according to one embodiment. The exemplary user ID message may be used in a PA or a PAA message. The user ID is a sub-TLV which is embedded inside the PA and PAA messages. The sub-TLV code of UID is 1. The length depends on the UID type. The Reserved field is set to 0 on transmission, ignored on reception. The UID type may be defined as follows:

| | |
|---|---|
| 0-16: | Reserved. |
| 17: | IEEE802 MAC address. Length is set to 10. The Value portion is 6 bytes MAC address. |
| 18: | ATM PVC. Length is set to 36. With 32 bits for VCID, followed by 16 bits of VPI, and 16 bits of VCI. |
| 19: | Frame Relay DLCI. Length is set to 10. With 32 bits for VCID, followed by 16 bits of DLCI. |
| 20: | GTP TID. Length is set to 12. The Value portion is 8 bytes TID. |
| 21: | L2TP Session ID. Length is set to 8.<br>The Value portion is 4 bytes L2TP session ID. |
| 22-255: | For future use. |

Figure 15:
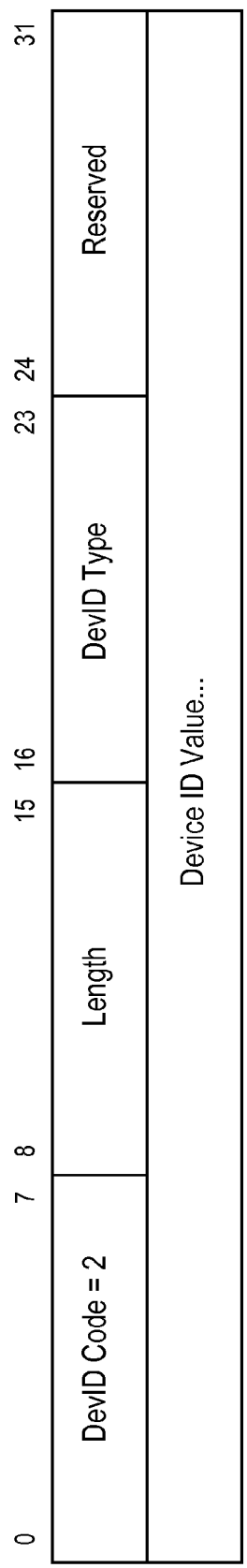

FIG. 15 is a block diagram illustrating an exemplary device ID message according to one embodiment. The exemplary device ID message may be a sub-TLV and embedded inside the PAA message, according to one embodiment. In one embodiment, the sub-TLV code of DevID is 2. The length depends on the DevID type. The Reserved field is set to 0 on transmission, ignored on reception. The DevID type may be defined as follows:

| | |
|---|---|
| 0-16: | Reserved. |
| 17: | Generic Device Type, the length is set to 20, which is defined in the following format, each of the field if unused should be set to 0:<br>4 bytes of device number(e.g. can be a IPv4 router ID),<br>2 bytes of virtual device number(e.g. can be a virtual router ID),<br>2 bytes of slot number,<br>4 bytes of port number,<br>4 bytes of sub-port number |
| 18-255: | For future use. |

In one embodiment, an optional authentication mechanism may be used with RMR protocol packets. When the authentication is enabled on the RMR, the sender needs to include this authentication TLV in the packet. If the authentication is enabled for the RMR, the receiver needs to check all the inbound RMR packets for this authentication TLV, the packet may be discarded if the authentication TLV is missing or the authentication value does not match the one defined locally.

Figure 16:
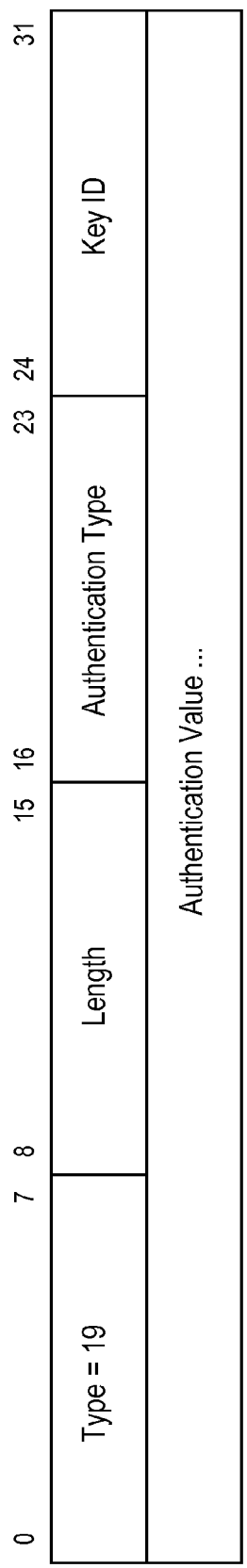

FIG. 16 is a block diagram illustrating an exemplary authentication message according to one embodiment. In one embodiment, parameters for the authentication message may be defined as follows:

| | |
|---|---|
| Message Type: | 19 |
| Length | Length of the message, 4 + length of the Authentication-Value field |
| Auth-type: | 1, Simple password mechanism<br>2, MD-5 authentication mechanism |
| Key-id | A number in the range of 0-255 to uniquely identify the MD-5 key used in the packet. In the case of simple password mechanism or single MD-5 key being used, this Key-id should be set to 0 by the sender, and ignored by the receiver. |
| Authentication-Value: | This is either a simple password string if the Auth-type is 1, or a 16 byte MD-5 Key if the Auth-type is 2. |

When the authentication type is MD-5, the algorithm requires a key K and text T as input. The key K is the password for the MD-5 scheme, and the text T is all the RMR messages in the packet to be authenticated with the Authentication-Value field inside this Authentication TLV set to zero. This text T does not include IP and UDP headers. Note that the Authentication Type is set to 2, and the Length is set to 20 and the Key-id is set to the desired value before the authentication is computed. The result of the algorithm is placed in the Authentication-Value field.

The RMR protocol has the authentication message defined, the use of MD-5 authentication mechanism is strongly recommended if the network security is a concern. The authentication mechanism described in section 4.5 can be applied to reduce the risk of unauthorized source injecting false information into the remote multicast replication system.

Although a DSL network has been described as an example throughout the present application, it is not so limited. It will be appreciated that the techniques described above may also be applied to other types of networks.

Thus, protocols for messaging between a BRAS and other entities have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
in response to a request of a subscriber for joining a multicast group received at a centralized aggregation server, transmitting a port subscriber announcement (PSA) message to a plurality of subscriber access multiplexers over an access network, the PSA message including an identifier (ID) of the subscriber;
in response to the PSA message, each of the subscriber access multiplexers determining whether there is a subscriber associated with each subscriber access multiplexer having an ID that matches the ID of the subscriber in the PSA message;
a subscriber access multiplexer having a subscriber matching the ID of the subscriber in the PSA message identifying a user port corresponding to the subscriber and applying a local service policy to the identified user port; and
the subscriber access multiplexer having a subscriber matching the ID of the subscriber in the PSA message transmitting a PSA acknowledgment (PSAA) message to the centralized aggregation server indicating whether the PSA message has been processed successfully, the PSAA message including an ID of the subscriber access multiplexer,
wherein subsequent multicast messages destined to the subscriber are delivered by the subscriber access multiplexer to the subscriber based on the local service policy corresponding to the receiving subscriber without having the aggregation server handling the service policy of the receiving subscriber.

2. The method of claim 1, wherein the PSAA message comprises subscriber level information, including a synchronization rate, regarding at least one subscriber coupled to a respective subscriber access multiplexer.

3. The method of claim 1, wherein the request for joining the multicast group is received via an IGMP (Internet group management protocol) report and the subscriber's ID is extracted from the IGMP report.

4. The method of claim 1, wherein the local service policy of the subscriber access multiplexer includes a quality of service (QoS) profile regarding each of the subscribers corresponding to the subscriber access multiplexer.

5. A method comprising:
in response to a request of a subscriber for joining a multicast group, a broadband remote aggregation server (BRAS) transmitting a port subscriber announcement (PSA) message to a plurality of digital subscriber line access multiplexers (DSLAMs) over an Ethernet, the PSA message including an identifier (ID) of the subscriber,
whereby in response to the PSA message, a DSLAM having a subscriber matching the ID of the subscriber in the PSA message identifies a user port corresponding to the subscriber and applies a local service policy to the identified user port, whereby subsequent multicast messages destined to the subscriber are delivered by the DSLAM to the subscriber based on the local service policy corresponding to the receiving subscriber without having the BRAS handling the service policy of the receiving subscriber;
the BRAS receiving a PSA acknowledgment (PSAA) message from a DSLAM having a subscriber matching the ID of the subscriber in the PSA message, the PSAA message indicating whether the PSA message has been processed successfully, the PSAA message including an ID of the subscriber access multiplexer;

in response to the PSAA message, the BRAS adding an Ethernet port leading to the subscriber joining the multicast group to an outgoing interface (OIF) list of multicast forwarding entries;

receiving at the BRAS a multicast message destined to the multicast group; and the BRAS transmitting the multicast message to the Ethernet port via the OIF corresponding to the DSLAM, where the transmitted multicast message is replicated by one or more receiving DSLAMs to individual subscribers.

6. The method of claim 1, wherein the ID of the subscriber includes a MAC (media access control) address of the subscriber.

7. The method of claim 6, further comprising, in response to the PSA message, each of the subscriber access multiplexers determining whether the respective subscriber access multiplexer is an intended recipient of the PSA message by checking whether MAC address of the subscriber matches one of the subscribers grouped under the respective subscriber access multiplexer.

8. A method, comprising:

receiving at a digital subscriber line access multiplexer (DSLAM) a port subscriber announcement (PSA) message from a broadband remote aggregation server (BRAS) in response to a request of a subscriber for joining a multicast group, wherein the PSA message is multicast to a plurality of DSLAMs, the PSA message including an identifier (ID) of the subscriber;

in response to the PSA message, the DSLAM matching each subscriber associated with the DSLAM with the ID of the subscriber in the PSA message;

if there is a subscriber having an ID matched with the ID of the subscriber in the PSA message, identifying a user port corresponding to the subscriber and applying a local service policy to the identified user port, whereby subsequent multicast messages destined to the subscriber are delivered by the DSLAM to the subscriber based on the local service policy corresponding to the receiving subscriber without having the BRAS handling the service policy of the receiving subscriber;

the DSLAM transmitting a PSA acknowledgment (PSAA) message to the BRAS indicating whether the PSA message has been processed successfully, the PSAA message including an ID of the DSLAM;

receiving at the DSLAM a new customer port of a subscriber via a unicast PVC leading to the BRAS; and transmitting a port binding announcement (PBA) message to the BRAS, the PBA message including one of a subscriber's port number and a PVC (permanent virtual circuit) number, and an ID of the DSLAM, whereby the BRAS builds a local mapping between the DSLAM port number and an incoming PVC number of the BRAS in response to the PBA message.

9. A method, comprising:

receiving at a digital subscriber line access multiplexer (DSLAM) a port subscriber announcement (PSA) message from a broadband remote aggregation server (BRAS) in response to a request of a subscriber for joining a multicast group, the PSA message including an identifier (ID) of the subscriber;

in response to the PSA message, the DSLAM matching each subscriber associated with the DSLAM with the ID of the subscriber in the PSA message;

if there is a subscriber having an ID matched with the ID of the subscriber in the PSA message, identifying a user port corresponding to the subscriber and applying a local service policy to the identified user port, whereby subsequent multicast messages destined to the subscriber are delivered by the DSLAM to the subscriber based on the local service policy corresponding to the receiving subscriber without having the BRAS handling the service policy of the receiving subscriber;

the DSLAM transmitting a PSA acknowledgment (PSAA) message to the BRAS indicating whether the PSA message has been processed successfully, the PSAA message including an ID of the DSLAM, whereby the PSA message is multicast to a plurality of DSLAMs over an asynchronous transfer mode (ATM) network, whereby in response to the PSA message, each DSLAM identifies whether the respective DSLAM is an intended recipient of the PSA based on at least one of a DSLAM port and a PVC number associated with the subscriber, and whereby an intended receiving DSLAM adds an outbound PVC label to point-to-multicast cell replication entries, wherein the subsequent multicast messages are replicated to one or more subscribers based on the point-to-multicast cell replication entries.

10. A method, comprising:

receiving at a digital subscriber line access multiplexer (DSLAM) a port subscriber announcement (PSA) message from a broadband remote aggregation server (BRAS) in response to a request of a subscriber for joining a multicast group, whereby the PSA message is multicast to a plurality of DSLAMs over an asynchronous transfer mode (ATM) network, the PSA message including an identifier (ID) of the subscriber;

in response to the PSA message, the DSLAM matching each subscriber associated with the DSLAM with the ID of the subscriber in the PSA message;

if there is a subscriber having an ID matched with the ID of the subscriber in the PSA message, identifying a user port corresponding to the subscriber and applying a local service policy to the identified user port, whereby subsequent multicast messages destined to the subscriber are delivered by the DSLAM to the subscriber based on the local service policy corresponding to the receiving subscriber without having the BRAS handling the service policy of the receiving subscriber; and the DSLAM transmitting a PSA acknowledgment (PSAA) message to the BRAS indicating whether the PSA message has been processed successfully, the PSAA message including an ID of the DSLAM, whereby in response to the PSAA message, the BRAS populates the multicast PVC identified in the PSAA message into a multicast outgoing interface (OIF) for the groups being joined, wherein the subsequent multicast messages transmitted to one or more DSLAMs via the OIF.

11. A method, comprising:

receiving at a layer 2 tunneling protocol (L2TP) access concentrator a port subscriber announcement (PSA) message from a L2TP network server (LNS) in response to a request of a subscriber for joining a multicast group, the PSA message including an identifier (ID) of the subscriber;

in response to the PSA message, the DSLAM matching each subscriber associated with the DSLAM with the ID of the subscriber in the PSA message;

if there is a subscriber having an ID matched with the ID of the subscriber in the PSA message, identifying a user port corresponding to the subscriber and applying a local service policy to the identified user port, whereby subsequent multicast messages destined to the subscriber are delivered by the LAC to the subscriber based on the local service policy corresponding to the receiving subscriber without having the LNS handling the service policy of the receiving subscriber;

the LAC transmitting a PSA acknowledgment (PSAA) message to the LNS indicating whether the PSA message has been processed successfully, the PSAA message including an ID of the subscriber access multiplexer, whereby the PSA message is multicast to a plurality of LACs over an Internet protocol (IP) network, whereby in response to the PSA message, each LAC determines whether the respective LAC is an intended recipient by checking whether the PSA message includes an ID of the respective LAC, and whereby an LAC having an ID that matches the LAC's ID in the PSA message sends a PSAA message back to the LNS indicating whether the operations are performed successfully.

12. The method of claim 11, further comprising:

in response to the PSAA message, the LNS registering the GRE tunnel associated with the LAC's ID; and the LNS adding the GRE tunnel to a list of multicast forwarding entries of the LNS, wherein subsequent multicast messages are forwarded to each LAC via a respective GRE tunnel listed in the list of multicast forwarding entries.

13. A subscriber network, comprising:

an aggregation server; and one or more subscriber access multiplexers coupled to the aggregation server over a subscriber access network, each of the one or more subscriber access multiplexers coupled to one or more subscribers, wherein in response to a request of a subscriber for joining a multicast group, the aggregation server transmits a port subscriber announcement (PSA) message to the one or more subscriber access multiplexers over the subscriber access network, the PSA message including an identifier (ID) of the subscriber, wherein each of the subscriber access multiplexers determines whether there is a subscriber associated with each subscriber access multiplexer having an ID that matches the ID of the subscriber in the PSA message, wherein in response to the PSA message, a subscriber access multiplexer having a subscriber matching the ID of the subscriber in the PSA message identifying a user port corresponding to the subscriber and applying a local service policy to the identified user port, wherein the subscriber access multiplexer having a subscriber matching the ID of the subscriber in the PSA message transmits a PSA acknowledgment (PSAA) message to the aggregation server indicating whether the PSA message has been processed successfully, the PSAA message including an ID of the subscriber access multiplexer, and wherein subsequent multicast messages destined to the subscriber are delivered by the subscriber access multiplexer to the subscriber based on the local service policy corresponding to the receiving subscriber without having the aggregation server handling the service policy of the receiving subscriber.

14. The subscriber network of claim 13, wherein the PSAA message comprises subscriber level information, including a synchronization rate, regarding at least one subscriber coupled to a respective subscriber access multiplexer.

15. The subscriber network of claim 13, wherein the request for joining the multicast group is received via an IGMP (Internet group management protocol) report and the subscriber's ID is extracted from the IGMP report.

16. The subscriber network of claim 13, wherein the local service policy of the subscriber access multiplexer includes a quality of service (QoS) profile regarding each of the subscribers corresponding to the subscriber access multiplexer.

17. The subscriber network of claim 13, wherein the centralized aggregation server is a broadband remote aggregation server (BRAS), wherein the subscriber access multiplexer is a digital subscriber line access multiplexer (DSLAM), and wherein the access network is an Ethernet.

18. The subscriber network of claim 13, wherein the centralized aggregation server is a broadband remote aggregation server (BRAS), wherein the subscriber access multiplexer is a digital subscriber line access multiplexer (DSLAM), and wherein the access network is an ATM network.

19. The subscriber network of claim 13, wherein the centralized aggregation server is an LNS, wherein the subscriber access multiplexer is an LAC, and wherein the access network is an IP network.

* * * * *

UNITED STATES PATENT AND TRADEMARK OFFICE
CERTIFICATE OF CORRECTION

PATENT NO. : 7,765,300 B2  Page 1 of 1
APPLICATION NO. : 10/957446
DATED : July 27, 2010
INVENTOR(S) : Meehan et al.

It is certified that error appears in the above-identified patent and that said Letters Patent is hereby corrected as shown below:

In Fig. 6, Sheet 6 of 16, in Box "605", in Line 2, delete "TOT HE" and insert -- TO THE --, therefor.

In Fig. 8, Sheet 8 of 16, in Box "802", in Line 4, delete "CONSTAINS" and insert -- CONTAINS --, therefor.

In Fig. 8, Sheet 8 of 16, in Box "805", in Line 1, delete "TOT" and insert -- TO --, therefor.

In Column 13, Line 10, delete "EP" and insert -- IP --, therefor.

Signed and Sealed this

Twenty-sixth Day of October, 2010

David J. Kappos
*Director of the United States Patent and Trademark Office*